H. KILLAM.
Carriage-Axle.
No. 218,443. Patented Aug. 12, 1879.
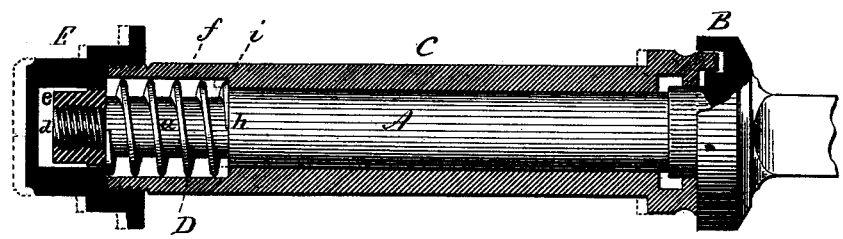

UNITED STATES PATENT OFFICE.

HENRY KILLAM, OF NEW HAVEN, CONNECTICUT.

IMPROVEMENT IN CARRIAGE-AXLES.

Specification forming part of Letters Patent No. 218,443, dated August 12, 1879; application filed June 18, 1879.

*To all whom it may concern:*

Be it known that I, HENRY KILLAM, of New Haven, in the county of New Haven and State of Connecticut, have invented a new Improvement in Carriage-Axles; and I do hereby declare the following, when taken in connection with the accompanying drawing, and the letters of reference marked thereon, to be a full, clear, and exact description of the same, which said drawing constitutes part of this specification, and represents a side view of axle-arm and longitudinal section of box.

This invention relates to an improvement in that class of carriage-axles in which a spring is arranged to take the longitudinal thrust between the box and axle; and it consists in the construction hereinafter described, and particularly recited in the claim.

A is the axle-arm; B, the collar or inner shoulder. At the forward end the arm is somewhat reduced in diameter, as at $a$, and provided at the extreme end with a screw-thread, $d$, to receive a nut, $e$. C is the box, which fits the arm A, but in length shorter than the arm, so as to leave an open space between the shoulder or collar B on the axle and the end of the box, and is chambered out at the front, as at $f$, a distance corresponding in length to the reduction $a$ of the arm, and so that the shoulder $h$ on the axle and $i$ in the box are on the same plane.

Into the space or chamber formed by the recess of the axle and enlargement of the opening in the box a spiral or other suitable spring, D, is introduced around the part $a$ of the axle, and so as to bear at its inner end both on the shoulder $h$ of the axle and the shoulder $i$ of the box, as shown.

After placing the spring upon the axle the nut $e$ is then screwed to place, bearing against the outer end of the spring D. This nut is of less external diameter than the internal diameter of the end of the box; hence the nut $e$ bears against the spring and not against the box.

Over the nut $e$ is a second nut, E, which is screwed onto the box, as seen in Figure 1, to bear against the outer end of the spring, serving also as a cover for but free from the inner nut; hence in the normal condition of the axle and box the spring is compressed from both ends alike between the box and the axle.

The action or operation of this construction is as follows: Suppose the thrust to be upon the wheel outward. In that case the outer end of the spring will take its bearing against the nut, which remains practically stationary, and the inner shoulder of the box will compress the spring toward the outer end, as shown in broken lines in the drawing; but if the thrust be in the opposite direction, then the box will compress the spring against the inner shoulder of the axle, as seen in Fig. 2; hence the single spring acts as a cushion for the thrust in both directions.

By this arrangement of the spring the bearing of the box upon the axle is reduced only at the front end instead of at two points in the usual construction, where thrust from both directions is cushioned on independent springs, and the single spring need be no larger than either of the springs in such construction.

In cases where a single spring has been used to take the thrust in both directions a much larger spring has been employed, and a consequent reduction of a bearing-surface between the box and axle.

By this construction the inner or axle nut is inclosed by the covering-nut, which also serves as a box-bearing on the spring, and so that by unscrewing both the covering-nut and axle-nut the spring may be removed, cleaned, and replaced, or a new one introduced, without taking the box from the hub.

I do not broadly claim the arrangement of a single spring in a chamber formed by a recess in both the box and axle, so that both axle and box will take a bearing upon the spring at both ends, as such, I am aware, is not new.

I claim—

The combination of an axle arm and box, the arm reduced in diameter at its forward end, and the box correspondingly chambered, so that corresponding shoulders are formed on both axle and box, with a spring in the space between the axle and box, and bearing on both said shoulders, a nut on the end of the axle, and a second nut serving as a cover for the axle-nut, and both nuts bearing upon the outer end of the spring, each independent of the other, substantially as described.

HENRY KILLAM.

Witnesses:
FRANCIS POTTER,
JOS. C. EARLE.